(12) United States Patent
Chang

(10) Patent No.: US 6,395,847 B2
(45) Date of Patent: *May 28, 2002

(54) SUPPORTED ORGANOMETALLIC CATALYSTS AND THEIR USE IN OLEFIN POLYMERIZATION

(75) Inventor: Main Chang, Houston, TX (US)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,723

(22) Filed: Nov. 19, 1999

(51) Int. Cl.$^7$ .............................. C08F 4/44; B01J 31/00; B01N 4/52

(52) U.S. Cl. .................. 526/160; 526/129; 526/130; 526/170; 526/178; 526/183; 526/195; 526/196; 526/335; 526/346; 526/348; 526/348.2; 526/351; 526/352; 526/901; 526/943; 502/103; 502/104; 502/117; 502/152; 502/153; 502/202; 502/232; 502/118

(58) Field of Search ................ 502/103, 104, 502/152, 153, 202, 232, 117, 118; 526/129, 130, 160, 170, 178, 183, 195, 196, 335, 346, 348, 348.2, 357, 352, 901, 943

(56) References Cited

U.S. PATENT DOCUMENTS

| | | | |
|---|---|---|---|
| 4,914,253 A | 4/1990 | Chang | 585/523 |
| 5,198,401 A | 3/1993 | Turner et al. | 502/155 |
| 5,288,677 A | 2/1994 | Chung et al. | 502/152 |
| 5,330,947 A | 7/1994 | Shamshoum et al. | |
| 5,422,325 A | 6/1995 | Jejelowo et al. | 502/104 |
| 5,427,991 A | 6/1995 | Turner | 502/103 |
| 5,434,115 A | 7/1995 | Yamada et al. | |
| 5,444,134 A | 8/1995 | Matsumoto | 526/159 |
| 5,612,271 A | 3/1997 | Zandona | 502/117 |
| 5,629,254 A | 5/1997 | Fukuoka et al. | 502/117 |
| 5,643,847 A | 7/1997 | Walzer, Jr. | 502/117 |
| 5,939,347 A | 8/1999 | Ward et al. | 502/104 |
| 5,972,823 A | 10/1999 | Walzer, Jr. | 502/152 |
| 6,121,401 A | 9/2000 | Yamamoto et al. | |
| 6,143,686 A | 11/2000 | Vizzini et al. | 502/152 |

FOREIGN PATENT DOCUMENTS

| | | |
|---|---|---|
| DE | 197 57 540 | 6/1999 |
| EP | 0571 987 A2 | 12/1993 |
| EP | 0 707 016 A1 | 4/1996 |
| WO | WO 96 23005 | 8/1996 |
| WO | WO 99/33881 | 7/1999 |
| WO | WO 00/04058 | 1/2000 |

Primary Examiner—Elizabeth D. Wood
(74) Attorney, Agent, or Firm—William G. Muller; Kevin M. Faulkner

(57) ABSTRACT

The invention is directed to organometallic catalysts prepared by a process comprising a) combining nucleophilic group-containing particulate support material with an arylboron or arylaluminum Lewis acid compound in the presence of a Lewis base compound; b) contacting the product of a) with a trialkylaluminum compound before combining said product with a metal precursor compound capable of activation for olefin polymerization by said product a); and, c) combining the product of b) with said metal precursor compound. These catalyst compositions are suitable for addition reactions of ethylenically and acetylenically unsaturated monomers. The invention includes a polymerization process of combining or contacting olefinically unsaturated monomers with the invention catalyst composition. Use of the invention catalyst to polymerize $\alpha$-olefins is exemplified.

22 Claims, No Drawings

US 6,395,847 B2

SUPPORTED ORGANOMETALLIC CATALYSTS AND THEIR USE IN OLEFIN POLYMERIZATION

TECHNICAL FIELD

This invention relates to catalyst compositions useful for polymerization reactions of olefinically unsaturated monomers. The invention is particularly useful in coordination polymerization processes that utilize supported catalyst compounds such as for slurry or gas phase polymerization of olefinically unsaturated monomers. The catalyst compositions comprise metal cation catalyst components, anionic cocatalyst components and particulate supports where the anionic cocatalyst is chemically bound to the supports.

BACKGROUND OF THE INVENTION

Coordination polymerization of olefinically unsaturated monomers is well known and has led to the great proliferation in modern society of elastomeric and plastic compositions of matter, such as polyethylene, polypropylene, and ethylene propylene rubber. Catalyst compounds with bulky ligand-containing transition metal components are now well-known in the art. Examples include cyclopentadienyl ligand containing transition metal compounds (e.g., metallocenes), bisamido and bisimido ligand containing transition metal compounds, as well as other transition metal compounds that are stabilized for polymerization reactions by structural inclusion of bulky ligands. Cocatalyst compounds containing, or capable of providing, non-coordinating anions, see for example U.S. Pat. Nos. 5,198, 401, 5,427,991, and 5,643,847, can be effectively used to stabilize the transition metal cations and maintain them in cationic form suitable for oligomerization and polymerization of olefins. These references describe protonation of metallocene compounds by anion precursors to form stable ionic catalysts; the latter two specifically teaching the use of anionic complexes directly bound to supports through chemical linkages. See also U.S. Pat. No. 5,939,347 which addresses protonating or abstracting cocatalyst activators bound to silica. All documents are incorporated by reference for their respective teachings as to anionic complexes, compounds and description of support materials.

Immobilized Lewis acid catalysts suitable for carbocationic polymerization are described in U.S. Pat. No. 5,288, 677. The Group III A Lewis acids of the invention are said to have the general formula $R_nMX_{3-n}$ where M is a Group III A metal, R is a monovalent hydrocarbon radical consisting of $C_1$ to $C_{12}$ alkyl, aryl, alkylaryl, arylalkyl and cycloalkyl radicals, n=0–3, and X is halogen. Listed Lewis acids include aluminum trichloride, trialkyl aluminums, and alkylaluminum halides. Immobilization is accomplished by reacting the invention Lewis acids with hydroxyl, halide, amine, alkoxy, secondary alkyl amines, and others, where the groups are structurally incorporated in a polymeric chain.

Industrial efficiencies and economics are significantly affected by catalyst activities, or productivities, where such is represented by the grams of polymer produced per gram of catalyst. Means of improving the use of supported catalysts is an important objective in the field of olefin polymerization, particularly for effective industrial use of such catalysts.

INVENTION DISCLOSURE

This invention is directed to solving the needs expressed above, and others as discussed below, and to a method for preparing an organometallic catalyst composition characterized by comprising a support material having covalently bound to the surface or surfaces thereof, directly through functional groups of the support material, a compatible anion that is also ionically bound to a catalytically active transition metal cation complex. Thus the invention specifically relates to olefin polymerization catalyst compositions prepared by a process comprising a) combining nucleophilic group-containing particulate support material with an arylboron or arylaluminum Lewis acid compound in the presence of a Lewis base compound and b) treating the product of a) with a trialkylaluminum compound before c) combining said product with a transition metal precursor compound capable of activation for olefin polymerization by said product a). Additionally the invention includes a polymerization process comprising contacting one or more monomers polymerizable by coordination or carbocationic polymerization under conventionally suitable polymerization conditions with the catalyst composition prepared by the invention process.

DETAILED DESCRIPTION AND EXAMPLES OF THE INVENTION

The catalyst compositions prepared by the invention process described above may be generically represented by the chemical formula $$[L_nL'_mM'R']^+[LA\text{---}T\text{---}R''\text{---}]^-, \qquad (1)$$

where $[L_nL'_mM'R']^+$ is the catalytically active metal cation and $[LA\text{---}T\text{---}R'\text{---}]^-$ is a support bound compatible anion. More specifically in this formula, $L_n$ is one or more bulky ligands (n equals $d^0-i$, where i equals 1–3 and $d^0$ is the highest oxidation state of M') covalently bound to M', $L'_m$ is a neutral, non-oxidizing ligand having a dative bond to M' (typically m equals 0 to 3), M' is a Group 3, 4, 5, 6, 8, 9, 10 or 11 metal, R' is a ligand having a σ bond to M' into which a polymerizable monomer or macromonomer can insert for coordination polymerization. LA is a Lewis acid that is capable of forming the anionic activator, T is a Group 14–16 heteroatom (non-carbon atom), and R"— is a metal/metalloid or polymeric substrate of the support material. See additionally the descriptions of U.S. Pat. Nos. 5,427,991 and 5,643,847.

The supports of the invention include any metal/metalloid oxides having surface hydroxyl groups exhibiting a $pK_a$ equal to or less than that observed for amorphous silica, i.e., $pK_a$ less than or equal to about 11. In forming the invention covalently bound anionic activator by a preferred method LA is selected so as to be capable of forming a dative complex with a silanol group (which acts as a Lewis base) thus forming a formally dipolar (zwitterionic) Bronsted acid structure bound to the metal/metalloid of the metal oxide support. Accordingly any of the conventionally known silica support materials that retain hydroxyl groups after dehydration treatment methods will be suitable in accordance with the invention. Because of availability, both of silica and silica containing metal oxide based supports, for example, silica-alumina, are industrially preferred. Silica particles, gels and glass beads are most typical.

These metal oxide compositions may additionally contain oxides of other metals, such as those of Al, K, Mg, Na, Si, Ti and Zr and should preferably be treated by thermal and/or chemical means to remove water and free oxygen. Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C., or more up to a point prior to decomposition of the support material, for several hours is permissible, and if higher loading of supported anionic activator is desired, lower calcining temperatures for lesser times will be suitable. Where the metal oxide is silica, loadings to achieve from less than 0.1 mmol to 3.0 mmol activator/g $SiO_2$ are typically suitable and can be achieved, for example, by varying the temperature of calcining from 200 to 800+° C. See Zhuralev, et al, Langmuir 1987, vol. 3, 316 where correlation between calcining temperature and times and hydroxyl contents of silicas of varying surface areas is described.

Polymeric supports are preferably hydroxyl-functional-group-containing polymeric substrates, but may be any of the primary alkyl amines, secondary alkyl amines, and others, where the groups are structurally incorporated in a polymeric chain and capable of a acid-base reaction with the Lewis acid such that a ligand filling one coordination site of the boron or aluminum atom is protonated and replaced by the polymer incorporated functionality. See, for example, the polymers of U.S. Pat. No. 5,288,677, the teachings of which are incorporated by reference for purposes of U.S. patent practice. In accordance with these teachings, preferred heteroatoms constituting the third ligand of the arylboron and arylaluminum compounds of the invention, will be Group 15 or 16 heteroatoms, most preferably oxygen or nitrogen, chemically bonded to the support material substrate. The preferred polymeric supports have average particle sizes in the range of 10 to 100 micron, pore volumes of 0.1 to 5 cc per gram of support, and contain 0.1 to 3.0 mmol functional group per gram of support.

The compatible anion neutral precursors that serve as the Lewis acid (LA) of the invention include any of the non-coordinating anion precursors of sufficient acidity to accept the available electron pair of a nucleophilic atom in the functional group of the support material and facilitate the protonation of the transition metal compound or a secondary proton acceptor, see below, by a resulting labile proton. The preferred activator anion neutral precursors that serve as the Lewis acid (LA) of the invention are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., trisperfluorophenyl boron. These precursors therefore should not possess any reactive ligands which can be protonated by the hydroxyl groups of the metal oxide (the silanol group proton). For example, any Group 13 element based Lewis acids having only alkyl, halo, alkoxy, and/or amido ligands, which are readily hydrolyzed in aqueous media, are not suitable. At least one ligand of LA must be sufficiently electron-withdrawing to achieve the needed acidity, for example, trisperfluorophenyl boron. See EP 0 425 697 and EP 0 520 732, WO 98/03558, WO 99/06412, U.S. Pat. No. 5,496,960 and copending U.S. application Ser. No. 09/351, 983, filed Jul. 12, 1999, and its equivalent International Application PCT/US99/1573. Typical metal/metalloid centers for LA will include boron, aluminum, antimony, arsenic, phosphorous and gallium. Most preferably LA is a neutral compound comprising a Group 13 metal/metalloid center with a complement of ligands together sufficiently electron-withdrawing such that the Lewis acidity is greater than or equal to that of $AlCl_3$. Examples include trisperfluorophenylboron, tris(3,5-di(trifluoromethyl) phenyl)boron, tris(di-t-butylmethylsilyl) perfluorophenylboron, tris(perfluorobiphenyl) boron, trisperfluornapthyl) boron, other highly fluorinated trisarylboron compounds and their aluminum-based counterparts.

Additionally, likely because of the sterically limiting presence of the surface of the support in addition to the sterically limiting stabilizing ligands (those not abstracted or replaced by a proton or alkyl group during protonation or alkylation) of the catalytically active transition metal compounds, the invention activator anions will include anions capable of coordination to the transition metal under conventional solution ionic reaction conditions while remaining labile. The term "labile" is an art recognized term meaning that under polymerization conditions the anion is only loosely coordinated at the site of catalyst activity so as to permit displacement by a polymerizable monomer at the point of monomer addition. Examples of Lewis acid precursors of typical coordinating anions of this invention include the bulky aluminum siloxides such as $Al(OSi(C_6H_5)_3)_3$, or $Al(OSi(O-t-butyl)_3)_3$ which can be generically represented as $Al(O(SiR''')_3)_3$ or $Al(OSi(O—R''')_3)_3$ where each R''' is the same or different bulky $C_4$ and higher carbon number substituent such as tert-butyl or higher MW branched aliphatic, aromatic, aliphatic substituted aromatic, etc.

Any catalyst precursor metal compound is suitable for activation by combination with the treated, immobilized cocatalyst of the invention in accordance with the invention when such compounds are capable of catalytic activation by the corresponding Lewis acid or ionic activators containing fluoroaryl boron or aluminum compounds or complexes. Such will include the known transition metal compounds useful in traditional Ziegler-Natta coordination polymerization and as well the metallocene compounds similarly known to be useful in coordination polymerization. These will typically include transition metal compounds where the metal is in either a $d^0$ oxidation state or a reduced oxidation state, and wherein at least one metal ligand can be protonated by the support bound anionic activator, particularly those ligands including hydride, alkyl, alkenyl and silyl. Ligands capable of protonation and transition metal compounds comprising them include those described in the art, see for example U.S. Pat. No. 5,198,401. Syntheses of these compounds is well known from the published literature. Additionally, where the metal ligands include halogen moieties (for example, bis-cyclopentadienyl zirconium dichloride) which are not capable of protonation under standard conditions, they can be converted via known alkylation reactions with organometallic compounds such as lithium or aluminum hydrides or alkyls, alkylalumoxanes, Grignard reagents, etc. See also EP-A-0 570 982 for the reaction of organoaluminum compounds with dihalo-substituted metallocene compounds prior to addition of activating anion compounds.

Additional description of metallocene compounds which comprise, or can be alkylated to comprise, at least one ligand capable of abstraction via protonation to form a metal cation appear in the patent literature, for example EP-A-0 129 368, U.S. Pat. Nos. 4,871,705, 4,937,299, 5,324,800 EP-A-0-418 044, EP-A-0 591 756, WO-A-92/00333 and WO-A-94/ 01471. Such metallocene compounds can be described for this invention as mono or biscylopentadienyl substituted Group 3, 4, 5, 6, 9, 10, or 11 metal compounds wherein the cyclopentadienyl substituents may be themselves substituted with one or more groups and may be bridged to each other, or may be bridged through a heteroatom to the central metal group. The size and constituency of the cyclopentadienyl substituents and bridging elements are not critical to the preparation of the ionic catalyst systems of the invention but should be selected in the literature described manner to enhance the polymerization activity and polymer characteristics being sought. Preferably the cyclopentadienyl (or substituted cyclopentadienyl, such as indenyl or substituted indenyl and fluorenyl and substituted fluorenyl) rings, when bridged to each other, will be hydrocarbyl-substituted ($C_1$–$C_{12}$) in the 2 position and will additionally comprise alkyl, cycloalkyl, aryl, alkylaryl and or arylalkyl subtituents, the latter as either of fused or pendant ring structures including multi-ring structures, for example, those of U.S. Pat. Nos. 5,278,264 and 5,304,614. Such substituents should each have essentially hydrocarbyl characteristics and will typically contain up to 30 carbon atoms but may be heteroatom containing with not more than 1–3 non-hydrogen/carbon atoms, e.g., N, S, O, P, and Si.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,198,401, 5,001,205, 5,324,800, 5,308,816, and 5,304,614 for specific listings.

Selection of metallocene compounds for use to make isotactic or syndiotactic polypropylene, and their syntheses, are well-known in the art, specific reference may be made to both patent literature and academic, see for example Journal of Organometallic Chemistry 369, 359–370 (1989). Typically those catalysts are stereorigid asymmetric, chiral or bridged chiral metallocenes. See, for example, U.S. Pat. No. 4,892,851, U.S. Pat. No. 5,017,714, U.S. Pat. No. 5,296,434, U.S. Pat. No. 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein. See also U.S. patents See also, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; 5,391,790, 5,145,819; 5,243,001; 5,239,022; 5,329,033; 5,296,434; 5,276,208; 5,672,668; 5,304,614; 5,374,752; 5,240,217; 5,510,502 and 5,643,847; and EP 549 900 and 576 970 all of which are herein fully incorporated by reference.

Though many above are directed to catalyst systems with alumoxane activators, the analogous metallocene compounds will be useful with the supported activator anions of this invention for active coordination catalyst systems, when at least one of the halogen containing ligands of the metals (where occurring) are replaced with ligands capable of protonation, for example, via an alkylation reaction as described above, and another is a group into which the ethene group —C=C— may insert, for example, hydride, hydrocarbyl, silyl and hydrocarbylsilyl.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl; bridged biscyclopentadienyl compounds such as dimethylsilylbis (tetrahydroindenyl) zirconium dichloride; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and the additional mono-, bis-, and triscyclopentadienyl compounds such as those listed and described in U.S. Pat. No. 5,324,800 and EP-A-0 591 756.

Additional bridged metallocene compounds, particularly preferred for polyolefin catalysis include:

Dimethylsilandiylbis (2-methyl-4-phenyl-1-indenyl) Zirconium dimethyl

Dimethylsilandiylbis(2-methyl-4,5-benzoindenyl) Zirconium dimethyl;

Dimethylsilandiylbis(2-methyl-4,6-diisopropylindenyl) Zirconium dimethyl;

Dimethylsilandiylbis(2-ethyl-4-phenyl-1-indenyl) Zirconium dimethyl;

Dimethylsilandiylbis(2-ethyl-4-naphthyl-1-indenyl) Zirconium dimethyl,

Phenyl(methyl)silandiylbis(2-methyl-4-phenyl-1-indenyl) Zirconium dimethyl,

Dimethylsilandiylbis(2-methyl-4-(1-naphthyl)-1-indenyl) Zirconium dimethyl,

Dimethylsilandiylbis(2-methyl-4-(2-naphthyl)-1-indenyl) Zirconium dimethyl,

Dimethylsilandiylbis(2-methyl-indenyl) Zirconium dimethyl,

Dimethylsilandiylbis(2-methyl-4,5-diisopropyl-1-indenyl) Zirconium dimethyl,

Dimethylsilandiylbis(2,4,6-trimethyl-1-indenyl) Zirconium dimethyl,

Phenyl(methyl)silandiylbis(2-methyl-4,6-diisopropyl-1-indenyl)Zirconium dimethyl, 1,2-Ethandiylbis(2-methyl-4,6-diisopropyl-1-indenyl) Zirconium dimethyl, 1,2-Butandiylbis(2-methyl-4,6-diisopropyl-1-indenyl) Zirconium dimethyl, Dimethylsilandiylbis(2-methyl-4-ethyl-1-indenyl) Zirconium dimethyl, Dimethylsilandiylbis(2-methyl-4-isopropyl-1-indenyl) Zirconium dimethyl, Dimethylsilandiylbis(2-methyl-4-t-butyl-1-indenyl) Zirconium dimethyl, Phenyl(methyl)silandiylbis(2-methyl-4-isopropyl-1-indenyl)Zirconium dimethyl, Dimethylsilandiylbis(2-ethyl-4-methyl-1-indenyl) Zirconium dimethyl, Dimethylsilandiylbis(2,4-dimethyl-1-indenyl) Zirconium dimethyl, Dimethylsilandiylbis(2-methyl-4-ethyl-1-indenyl) Zirconium dimethyl, Dimethylsilandiylbis(2-methyl-4-acenaphth-1-indenyl) Zirconium dimethyl, Phenyl(methyl)silandiylbis(2-methyl-4,5-benzo-1-indenyl) Zirconium dimethyl, Phenyl(methyl)silandiylbis(2-methyl-4,5-(methylbenzo)-1-indenyl)Zirconium dimethyl, Phenyl(methyl)silandiylbis(2-methyl-4,5-(tetramethylbenzo)-1-indenyl)Zirconium dimethyl,
Phenyl(methyl)silandiylbis(2-methyl-a-acenaphth-1-indenyl)Zirconium dimethyl,
1,2-Ethandiylbis(2-methyl-4,5-benzo-1-indenyl) Zirconium dimethyl,
1,2-Butandiylbis(2-methyl-4,5-benzo-1-indenyl) Zirconium dimethyl,
Dimethylsilandiylbis(2-methyl-4,5-benzo-1-indenyl) Zirconium dimethyl,
1,2-Ethandiylbis(2,4,7-trimethyl-1-indenyl) Zirconium dimethyl,
Dimethylsilandiylbis(2-methyl-1-indenyl) Zirconium dimethyl,
1,2-Ethandiylbis(2-methyl-1-indenyl) Zirconium dimethyl,
Phenyl(methyl)silandiylbis(2-methyl-1-indenyl) Zirconium dimethyl,
Diphenylsilandiylbis(2-methyl-1-indenyl) Zirconium dimethyl,
1,2-Butandiylbis(2-methyl-1-indenyl) Zirconium dimethyl,
Dimethylsilandiylbis(2-ethyl-1-indenyl) Zirconium dimethyl,
Dimethylsilandiylbis(2-methyl-5-isobutyl-1-indenyl) Zirconium dimethyl,
Phenyl(methyl)silandiylbis(2-methyl-5-isobutyl-1-indenyl) Zirconium dimethyl,
Dimethylsilandiylbis(2-methyl-5-t-butyl-1-indenyl) Zirconium dimethyl,
Dimethylsilandiylbis(2,5,6-trimethyl-1-indenyl) Zirconium dimethyl,
Dimethylsilandiylbis (2-methyl-4-phenyl-1-indenyl) Zirconium dichloride
Dimethylsilandiylbis(2-methyl-4,5-benzoindenyl) Zirconium dichloride,
Dimethylsilandiylbis(2-methyl-4,6-diisopropylindenyl) Zirconium dichloride,
Dimethylsilandiylbis(2-ethyl-4-phenyl-1-indenyl) Zirconium dichloride,
Dimethylsilandiylbis (2-ethyl-4-naphthyl-1-indenyl) Zirconium dichloride,
Phenyl(methyl)silandiylbis(2-methyl-4-phenyl-1-indenyl) Zirconium dichloride,
Dimethylsilandiylbis(2-methyl-4-(1-naphthyl)-1-indenyl) Zirconium dichloride,
Dimethylsilandiylbis(2-methyl-4-(2-naphthyl)-1-indenyl) Zirconium dichloride,
Dimethylsilandiylbis(2-methyl-indenyl) Zirconium dichloride,
Dimethylsilandiylbis(2-methyl-4,5-diisopropyl-1-indenyl) Zirconium dichloride,
Dimethylsilandiylbis(2,4,6-trimethyl-,-indenyl) Zirconium dichloride,
Phenyl(methyl )silandiylbis(2-methyl-4,6-diisopropyl-1-indenyl) Zirconium dichloride,
1,2-Ethandiylbis(2-methyl-4,6-diisopropyl-1-indenyl) Zirconium dichloride,
1,2-Butandiylbis(2-methyl-4,6-diisopropyl-1-indenyl) Zirconium dichloride,
Dimethylsilandiylbis(2-methyl-4-ethyl indenyl) Zirconium dichloride,
Dimethylsilandiylbis(2-methyl-4-isopropyl-indenyl) Zirconium dichloride,
Dimethylsilandiylbis(2-methyl-4-t-butyl-1-indenyl) Zirconium dichloride,
Phenyl(methyl)silandiylbis(2-methyl-4-isopropyl-1-indenyl) Zirconium dichloride,
Dimethylsilandiylbis(2-ethyl-4-methyl-1-indenyl) Zirconium dichloride,
Dimethylsilandiylbis(2,4-dim ethyl-1-indenyl) Zirconium dichloride,
Dimethylsilandiylbis(2-methyl-4-ethyl-1-indenyl) Zirconium dichloride,
Dimethylsilandiylbis(2-methyl-α-acenaphth-1-indenyl) Zirconium dichloride,
Phenyl(methyl)silandiylbis(2-methyl-4,5-benzo-1-indenyl) Zirconium dichloride,
Phenyl(methyl)silandiylbis(2-methyl-4,5-(methylbenzo)-1-indenyl) Zirconium dichloride,
Phenyl(methyl)silandiylbis(2-methyl-4,5-(tetramethylbenzo)-1-indenyl) Zirconium dichloride,
Phenyl(methyl)silandiylbis (2-methyl-a-acenaphth-1-indenyl) Zirconium dichloride,
1,2-Ethandiylbis(2-methyl-4,5-benzo-1-indenyl) Zirconium dichloride,
1,2-Butandiylbis(2-methyl-4,5-benzo-1-indenyl) Zirconium dichloride,
Dimethylsilandiylbis(2-methyl-4,5-benzo-1-indenyl) Zirconium dichloride,
1,2-Ethandiylbis(2,4,7-trimethyl-1-indenyl) Zirconium dichloride,
Dimethylsilandiylbis(2-methyl-1-indenyl) Zirconium dichloride,
1,2-Ethandiylbis(2-methyl-1-indenyl) Zirconium dichloride,
Phenyl(methyl)silandiylbis(2-methyl-1-indenyl) Zirconium dichloride,
Diphenylsilandiylbis(2-methyl-1-indenyl) Zirconium dichloride,
1,2-Butandiylbis(2-methyl-1-indenyl) Zirconium dichloride,
Dimethylsilandiylbis(2-ethyl-51u-indenyl) Zirconium dichloride,
Dimethylsilandiylbis(2-methyl-5-isobutyl-1-indenyl) Zirconium dichloride,
Phenyl(methyl)silandiylbis(2-methyl-5-isobutyl-1 -indenyl) Zirconium dichloride,
Dimethylsilandiylbis(2-methyl-5-t-butyl-1-indenyl) Zirconium dichloride,
Dimethylsilandiylbis(2,5,6-trimethyl-1-indenyl) Zirconium dichloride,
and the like, particularly the structurally similar hafnium compounds.

Many of these desirable transition metal compound components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970 all of which are herein fully incorporated by reference.

Additionally, metallocenes such as those described in U.S. Pat. No. 5,510,502, U.S. Pat. No. 4,931,417, U.S. Pat. No. 5,532,396, U.S. Pat. No. 5,543,373, WO 98/014585, EP611 773 and WO 98/22486 (each fully incorporated herein by reference) are suitable for use in this invention.

Representative traditional Ziegler-Natta transition metal compounds include tetrabenzyl zirconium, tetra bis (trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction by protonation and that ligand into which the ethene (olefinic) group can be inserted. These features enable the protonation of the transition metal compound and the concomitant formation of the ionic catalyst composition of the invention.

Additional organometallic metal compounds suitable as olefin polymerization catalysts in accordance with the invention will be any of those of Group 3–11 metals that can be converted by ligand abstraction into a catalytically active cation and stabilized in that active electronic state by a noncoordinating or weakly coordinating anion sufficiently labile to be displaced by an olefinically unsaturated monomer such as ethylene or propylene. Exemplary compounds include those described in the patent literature. U.S. Pat. No. 5,318,935 describes bridged and unbridged bisamido transition metal catalyst compounds of Group 4 metals capable of insertion polymerization of α-olefins. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. WO 96/23010 describes diimine Group 10 nickel and palladium compounds suitable for ionic activation and olefin polymerization. WO 99/30822 describes Group 11 transition metal amine catalysts for olefin polymerization and copolymerization with polar monomers. U.S. Pat. No. 5,851,945 describes Group 5 metals non-metallocene catalysts. Reduced oxidation state Group 4–6 transition metal catalysts are broadly described in the background and description of WO 99/29739. Bridged bis(arylamido) Group 4 compounds for olefin polymerization are described by D. H. McConville, et al, in *Organometallics* 1995, 14, 5478–5480. Synthesis methods and compound characterization are presented. Further work appearing in WO 98/37109 describes bridged bis(arylamido) Group 4 compounds active as catalysts for polymerization of α-olefins and geminally disubstituted olefins such as isobutylene. Each of these documents is incorporated by reference for the purposes of U.S. patent practice.

The supported ionic catalyst composition of the invention can be prepared, for example, by selecting as the Lewis acid which forms the Lewis acid-base complex, one that is capable of serving as a suitable counter anion upon protonation of the transition metal compound with the proton from a Lewis acid-base hydroxyl group complex. This reaction sequence can be represented by the following silanol chemical reaction equations

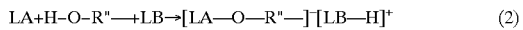

$$LA + H-O-R'' \rightarrow LB \rightarrow [LA-O-R''-]^-[LB-H]^+ \quad (2)$$

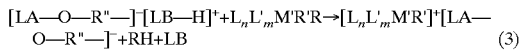

$$[LA-O-R''-]^-[LB-H]^+ + L_nL'_mM'R'R \rightarrow [L_nL'_mM'R']^+[LA-O-R''-]^- + RH + LB \quad (3)$$

where the symbols $L_n$, $L'_m$, M', R', LA, and R" are as defined for (1) above, specifically R" is Si, H is hydrogen, and R a ligand capable of abstraction by protonation. The reaction is typically run in a hydrocarbyl solution (heptane, toluene, etc.) at ambient temperature and pressure and the supported catalyst can be separated, for example, by filtration. The reaction can be run essentially as described above. LB is a Bronsted base, such as diethylaniline which forms an ammonium salt with the supported anionic activator [LA—O—R"—]$^-$, as in (2). Other examples of LB include dimethylaniline, diphenylmethylamine, tributylamine, diphenylmethylamine, triphenylphosphine, and trimethyl phosphite.

Several constraints must be placed on LB if the catalyst invention is to result in an active catalyst: (a) LB must be a strong enough Bronsted base to abstract a proton as shown in (3a), (b) LB cannot be so strong a Bronsted base so that its conjugate acid would be unable to protonate the transition metal compounds of the invention, thus its pKbH+ must be less than that of RH, (c) the [LA—O—R"—]$^-$[LB—H]$^+$ complex must have a kinetically accessible proton and (d) LB must be a sufficiently poor Lewis base (and/or possess sufficient steric bulk) that it does not compete effectively with polymerizable monomer for the vacant coordination site at the cationic metal center. It should be noted that condition (a) is to some extent dependent on the Lewis acidity of LA, since this determines the Bronsted acidity of the (LA)(H—O—R"—) complex. Examples of potential LB's which do not lead to active catalysts are: perfluoro (tributyl)amine (not a strong enough Bronsted base), "proton sponge" 1,9-N,N,N,N-tetramethyl-1,8-naphthalene diamine (protonated form does not react with $L_nL'_mM'R'R$), and quinoline (good Lewis base which coordinates to the metal center, M').

Subsequent to the reaction of the support substrate material with the arylboron or arylaluminum Lewis acids, optionally added with the Lewis base compound, and prior to use in polymerization, the reaction product supported activator is treated with an alkylaluminum compound such as triethylaluminum, triisobutylaluminum, etc. Without intending to limit the scope of the invention, it appears that residual nucleophilic groups of the support material are effectively neutralized such that activity, or productivity is significantly enhanced. U.S. Pat. No. 5,643,847 describes the use of chemical dehydration agents, including alkylaluminums, to eliminate excess hydroxyl groups on silica, but suggests that such be done prior to reaction of the Lewis acid and Lewis base compound with the support material. The process of this application's invention was tested against the pretreatment method and found to exhibit unexpected improvements in productivies, see examples 12A–12C below. Optionally, after this reaction sequence the supported activator may be additionally treated with a alkylaluminum compound prior to combining or contacting with the catalyst metal pecursor compounds. Optional drying prior to, or after addition, of the metal catalyst precursor compound will permit storage for use for different processes with varying catalysts and with varying schedules for use.

In an additional embodiment, the alkylaluminum compound may be added solely after the addition of the organometallic compound, in either sequence of steps the addition of the aluminum compounds appears to decrease the sensitivity of the resulting catalyst compositions to the effect of poisons, in addition to capping residual silanol groups not reacted with the organometallic compounds. This can result in increased activities of the catalyst in terms of grams of polymer produced per gram of supported catalyst. Further, the pre-reaction of the arylboron or arylaluminum Lewis acids with the Lewis base compound prior to addition to the nucleophilic support, along with the subsequent alkylaluminum treatment, shows additional productivity benefits that appear to arise from the reduced reactivity of the Lewis acids with the surface nucleophilic groups, e.g., silanol groups, to the particulate supports. The resulting Lewis acid-base complexes accordingly can be distributed more evenly, or homogeneously, within pores of the particulate supports to provide improved polymer morphology and reduced fouling.

Typically the above alkylaluminum compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include trimethylaluminum, triethylaluminum, tripropylaluminum, trisiopropylaluminum, triethyl borane, triisobutylaluminum, methylalumoxane, isobutyl aluminumoxane, tri-n- hexylaluminum, tri-n-octylaluminum, or tri-n-dodecylaluminum. Triethylaluminum is preferred.

This method of preparation results in a number of reaction products. The reaction of LA with the nucleophilic group of the support material, in the presence of LB, results in high yields (>95%) of an intermediate reaction product that is an immobilized activator precursor composition having essentially all of the activator anion precursor species covalently bound to the metal oxide support. Addition of the alkylaluminum modifying compound can be used prior to the addition of the metal compound to cap any unreacted (H—O—R"—) and yield an intermediate supported activator that both stable and capable of high productivity when the metal compound is added.

In order to improve or facilitate either reaction the selection of R can be such that RH is a gas that can be readily separated from the reaction solvent. Thus where R is —H or —$CH_3$, protonation results in hydrogen or methane gas respectively under both methods of preparation.

This catalyst invention is useful in coordination polymerization of unsaturated monomers conventionally known to be polymerizable under coordination polymerization conditions. Such conditions also are well known and include bulk polymerization, slurry polymerization, and low pressure gas phase polymerization. The supported catalysts of the invention are thus particularly useful in the known operating modes employing fixed-bed, moving-bed, fluid-bed, gas phase or slurry processes conducted in single, series or parallel reactors.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins/diolefins, are produced by adding ethylene, and optionally the other monomers, to a reaction vessel under low pressure (typically <50 bar), at a typical temperature of 20–250 ° C. with the invention catalyst that has been slurried with a solvent, such as isobutane or hexane. Heat of polymerization is typically removed by cooling. Polymer forms as granules that are usually insoluble in the reaction diluent. Termination of polymerization generally occurs via beta hydride elimination resulting in terminal olefinic unsaturation or by the addition of a chain transfer agent such as hydrogen or aluminum alkyl resulting in chain end saturation. The polymer may be filtered or centrifuged off, washed, and dried, i.e., for slurry reactions. As indicated, chain transfer agents should be avoided if chain end unsaturation is to be retained. Gas phase polymerization can be conducted, for example, in a continuous fluid bed gas-phase reactor operated at 2000–3000 kPa and 60–160 ° C., using hydrogen as a reaction modifier (100–200 ppm), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and co-pending U.S. application Ser. No. 08/053,067 filed Apr. 26, 1993.

Polypropylene typically can be prepared essentially as described for linear polyethylene above. The reaction diluent is often comprised of liquid propylene monomer in which the supported ionic catalyst is slurried. Other monomers, typically the lower alpha-olefins (e.g., $C_2$–$C_{10}$) and/or $C_4$–$C_{20}$ non-conjugated diolefins, can be introduced into the reaction diluent or solvent when either of polyethylene or polypropylene copolymers are to be prepared. The polymerization reactions for all of linear polyethylene, polypropylene and polyolefin polymers may be conducted in any suitable reactor, for example, in batch, continuous flow, parallel or series reactors. The catalyst compounds according to the invention are particularly suitable for the preparation of isotactic polypropylene and largely isotactic polypropylene copolymers (with or without additional non-crystalline or semi-crystalline copolymers) by bulk slurry and/or gas phase polymerization in single or series loop polymerization reactors known and described in the open literature. See, for example, U.S. Pat. Nos. 4,308,357, 5,280,074, 5,648,422, 5,643,847 and 5,708,090.

Ethylene-α-olefin(-diolefin) elastomers of high molecular weight and low crystallinity can be prepared utilizing the catalysts of the invention by introducing ethylene gas into a slurry utilizing the α-olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between –10–100° C. The process can be carried out in a stirred tank reactor, or more than one operated in series or parallel. Deashing can be accomplished in accordance with conventional knowledge in the art, or if to be avoided a process using one or more fixed bed or packed column reactors (see below) may be used. See the general disclosure of U.S. Pat. No. 5,001,205 for general process conditions and selection of preferred transition metal compounds, which if having halide ligands on the transition metal preferably should be alkylated as discussed above for utility with the ionic catalyst compositions of the invention.

Pre-polymerization of the supported catalyst of the invention may also be used for further control of polymer particle morphology in typical slurry or gas phase reaction processes in accordance with conventional teachings. For example such can be accomplished by pre-polymerizing a $C_2$–$C_6$ alpha-olefin for a limited time, for example, ethylene is contacted with the supported catalyst at a temperature of —15 to 30 ° C. and ethylene pressure of up to about 250 psig (1724 kPa) for 75 min. to obtain a polymeric coating on the support of polyethylene of 30,000–150,000 molecular weight. The pre-polymerized catalyst is then available for use in the polymerization processes referred to above. In a similar manner, the activated catalyst on a support coated with a previously polymerized thermoplastic polymer can be utilized in these polymerization processes.

Additionally it is preferred to avoid the effect of polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds of U.S. Pat. Nos. 5,153,157, 5,767,208 and WO-A-91/09882 and WO-A-94/03506, and that of WO-A-93/14132. Preferably the amount of scavenging agent is minimized, or avoided altogether, during polymerization reactions as determined empirically to determine when activities are being adversely affected by added scavenging agents.

Other olefinically unsaturated monomers besides those specifically described above may be polymerized using the catalyst according to the invention either by coordination or carbocationic polymerization, for example, styrene, alkyl-substituted styrene, ethylidene norbornene, norbornadiene, dicylopentadiene, cyclopentene, norbornene and other alpha olefinic unsaturated and strained geometry cyclic olefins, isobutylene, isoprene, butadiene, vinyl ethers, vinyl carbazoles, etc. Additionally because of the ability of certain of the catalytically active transition metal based catalysts to incorporate higher alpha-olefin monomers, alpha-olefinic macromonomers of up to 1000 mer units, or more, may also be incorporated by copolymerization. The resulting polymers may be homopolymers or copolymers of more than one monomer, and may be of any of the recognized tacticity forms depending upon the selection of metallocene cation precursor and monomer in accordance with conventional knowledge in the art. See for example U.S. Pat. Nos. 5,066,741 and 5,206,197, which address the preparation of syndiotactic vinyl aromatic polymers with single $\eta^5$-cyclopentadienyl metallocene compounds activated by non-coordinating, compatible anions; U.S. Pat. Nos. 5,278,265, and 5,304,523 addressing preparation of isotactic and syndiotactic polypropylene under low temperature conditions using chiral metallocenes with non-coordinating anions; and, U.S. Pat. Nos. 5,324,801 and 5,837,787 addressing preparation of cyclic olefin-containing copolymers using specific metallocene compounds as catalysts, each of which can be activated in accordance with this invention. See also U.S. Pat. No. 5,763,556 addressing the use of monocyclopentadienyl-based group 4 metal catalyst compounds capable of copolymerization of ethylene and geminally disubstituted olefins, such as isobutylene.

The polyolefin polymers produced with invention catalyst system have utility according to molecular weight, level of comonomer incorporation, where included, and polydispersity ("MWD"), etc. for their conventional and known uses. Thus films, fibers, and moldable thermoplastics by any of the known means of melt processing and subsequent extrusion, and/or, thermoforming are typical applications. In such, inclusion of additives such as processing aids, stabilizers, pigments, fillers as conventionally known can be utilized. High density polyethylene and isotactic polypropylene films, including those that are oriented in one or both axes and those modified with other components such as hydrocarbon tackifier resins are specific examples.

The supported ionic catalyst compositions of the invention can be used as described above individually for coordination polymerization or can be mixed to prepare polymer blends. By selection of monomers, blends of coordination polymers and blends of carbocationic polymers, or the two together, can be prepared under polymerization conditions analogous to those using individual catalyst compositions. Polymers having increased MWD for improved processing and other traditional benefits available from polymers made with mixed catalyst systems can thus be achieved.

The supported anionic activator forming an intermediate species of the invention prior to addition of the transition metal compounds can additionally be used to improve the catalyst properties of other known discrete catalyst cations. Examples include: hydrogenation catalysts based on Group 9 metals such as rhodium, e.g., [Rh(diene)(PPh$_3$)$_2$]$^+$and [Rh(diphos)]$^+$; olefin dimerization catalysts such as those based on Group 8 nickel or palladium, e.g., [Ni(L)$_4$H]$^+$; methacrylate dimerization catalysts such as those based on rhodium metallocenes, e.g., [CpRh(L)(alkyl)]$^+$; and, late transition metal olefin polymerization catalysts such as cobalt metallocenes, e.g., [CpCo(L)(alkyl)]$^+$. In the foregoing standard chemical symbols are used with certain substituent abbreviations: Ph is phenyl, L is a covalent ligand and Cp is cyclopentadiene. A preferred method of using entails reacting the Lewis acid (LA) with a fixed bed or ion exchange column having immobilized silica and then introducing a salt of the discrete catalyst cation in solution for ion exchange reaction with the immobilized reaction product. The fixed bed or ion exchange column is then available for the introduction of monomeric reactants in a reaction medium suitable for the reaction being conducted. See, e.g., "Comparison of Migratory Aptitudes of Hydrides and Alkyl Groups in β-Migration Insertion Reactions of Cp* (P(OMe)$_3$ Rh(C$_2$H$_4$)R+ (R=—H, —CH$_2$CH$_3$)", M. Brookhart and D. M. Lincoln, *J. Am. Chem. Soc.*, 110, 8719–8720(1988).

EXAMPLES

The following examples are presented to illustrate the foregoing discussion. In these examples certain abbreviations are used to facilitate the description. These include: Me=methyl, Ph=phenyl, Ind=indenyl, Zr=zirconium, and Si=silicon. "Davison 952, calcined at 600° C." represents the commercial silica support product of Grace Davison, Inc., which has been calcined at 600° C. under a dry N$_2$ flow for 8–24 hours, so as to achieve a hydroxyl content of 0.2–0.8 mmol/g silica.

Example 1

5 g of silica gel (Davison D-952, APS=35 μ, dried at 600° C.) was charged into a 125 ml vial equipped with a magnetic stirring bar. Into a 50 ml vial equipped with a magnetic stirring bar, 0.45 g of B(C$_6$F$_5$)$_3$ and 20 ml of hexane were charged. The mixture was stirred on a hot plate set at 60° C. until all the B(C$_6$F$_5$)$_3$ was dissolved. The solution was then transferred to the silica-containing vial followed by the addition of 0.14 ml of N,N-diethylaniline. The mixture was stirred on the hot plate for 1 hour. 1.5 ml of triethylaluminum in heptane (25 wt %) was charged into the vial and the mixture was stirred on the hot plate for 10 min. Into a 50 ml vial equipped with a magnetic stirring bar, 0.076 g of rac-Me$_2$Si(2-Me-4-phenyl-1-Ind)$_2$Zr(CH$_3$)$_2$, 10 ml of hexane, and 0.1 ml of phenyldimethylvinylsilane were charged. The mixture was stirred at ambient temperature for 10 minutes then transferred to the silica-containing vial. The mixture was stirred on the hot plate for 30 minutes. 1.0 ml of triethylaluminum in heptane (25 wt %) was charged into the vial. The vial was dried by nitrogen purging until a free flowing solid was obtained.

Into a clean 2-l autoclave, 0.1 ml of triethylaluminum in heptane (1.5 M) solution, 50 kpa of H$_2$ and 1 l of liquid propylene were charged. The reactor was heated to 70° C. 50 mg of the catalyst prepared above was then charged into the autoclave through a catalyst injection tube. The catalyst was washed into the autoclave by 200 ml of liquid propylene. The total pressure inside the reactor was around 460 psig. The polymerization was allowed to proceed at 70° C. for 1 hour. After the polymerization, the remaining propylene in the reactor was allowed to evaporate and the polymer was transferred into an evaporation dish. The autoclave inside wall and agitator were very clean. A total of 334 g of polymer was obtained.

Example 2

Example 1 was repeated except that 0.3 g of B(C$_6$F$_5$)$_3$ and 0.096 ml of N,N-diethylaniline were used in the catalyst preparation. Also 1.88 ml of triethylaluminum in heptane (25 wt %) was charged before the metallocene addition. The catalyst was tested after its preparation. A total of 351 g polymer was obtained.

Example 3

Example 2 was repeated except that no triethylaluminum was used after the addition of metallocene but before the drying step. The catalyst was tested after its preparation. A total of 256 g polymer was obtained.

Example 4

Example 1 was repeated except that 0.15 g of $B(C_6F_5)_3$ and 0.048 ml of N,N-diethylaniline as used in the catalyst preparation. Also 2.25 ml of triethylaluminum in heptane (25 wt %) was charged before the metallocene addition. The catalyst was tested after its preparation. A total of 181 g polymer was obtained.

Example 5

Example 4 was repeated except that no triethylaluminum was used before the drying step. The catalyst was tested after its preparation. A total of 130 g polymer was obtained

Example 6

Example 5 was repeated except toluene solvent was used in the catalyst preparation and the catalyst was prepared at ambient temperature. The catalyst was tested after its preparation. A total of 35 g polymer was obtained.

Example 7 (Comparative)

Example 6 was repeated except that 0.3 g of $B(C_6F_5)_3$ and 0.096 ml of N,N-diethylaniline were used in the catalyst preparation. Also no triethylaluminum was charged before the metallocene addition and 2.0 ml of triethylaluminum was added after that addition but before the drying step. The catalyst was tested after its preparation. A total of 36 g polymer was obtained.

Example 8 (Comparative)

Example 6 was repeated except that 0.1 ml of N,N-diethylaniline was used. Also instead of triethylaluminum, 0.27 ml of phenylsilane (a known capping agent for hydroxyl-group containing silica) was added before the metallocene addition. The catalyst was tested after its preparation. A total of 10 g polymer was obtained.

Example 9 (Comparative)

5 g of silica gel (Davison D-952, APS =35$\mu$, dried at 600° C.) was charged into a 125 ml vial equipped with a magnetic stirring bar. Into a 50 ml vial equipped with a magnetic stirring bar, 0.15 g of $B(C_6F_5)_3$, 20 ml of toluene, 0.076 g of rac-$Me_2Si(2-Me-4-phenyl-1-Ind)_2Zr(CH_3)_2$, 0.1 ml of phenyldimethylvinylsilane, and 2.0 ml of triethylaluminum in heptane (25 wt %) were mixed. The solution was then transferred to the silica-containing vial. The mixture was stirred at ambient temperature for 10 minutes. 0.35 ml of N,N-diethylaniline was charged into the vial and the mixture was stirred at ambient temperature for 1 hr. The mixture in the vial was dried by nitrogen purging until a free flowing solid was obtained. The resulting catalyst was tested after its preparation. A total of 7 g polymer was obtained.

Example 10 (Comparative)

5 g of silica gel (Davison D-952, APS =35$\mu$, dried at 600° C.) was charged into a 125 ml vial equipped with a magnetic stirring bar. Into a 50 ml vial equipped with a magnetic stirring bar, 1.09 g of $B(C_6F_5)_3$ and 20 ml of hexane were charged. The mixture was hold on a hot plate set at 60° C. for 5 minutes until all $B(C_6F_5)_3$ was dissolved. The solution was then transferred to the silica-containing vial followed by the addition of 0.35 ml of N,N-diethylaniline. The mixture was stirred on the hot plate for 1 hour. Into a 50 ml vial equipped with a magnetic stirring bar, 0.076 g of rac-$Me_2Si$ $(2-Me-4-phenyl-1-Ind)_2Zr(CH_3)_2$, 10 ml of hexane, and 0.1 ml of phenyldimethylvinylsilane were charged. The mixture was stirred at ambient temperature for 10 minutes then transferred to the silica-containing vial. The mixture was stirred on the hot plate for 30 minutes. A 1.0 ml of triethylaluminum in heptane (25 wt %) was then charged into the vial. The vial was dried by nitrogen purging until a free flowing solid was obtained.

The resulting catalyst was tested after its preparation. A total of 354 g polymer was obtained. Note that the yield here was roughly equivalent to that achieved by the invention preparation process of Example 1 but was achieved with more than twice the amount of $B(C_6F_5)_3$. Ex. 1 used only 0.45 g of $B(C_6F_5)_3$ compared to 1.09 g in this example.

Example 11A (Comparative)

5 g of silica gel (Davison D-952, dried at 600° C.) was charged into a vial equipped with a magnetic stirring bar. 20 ml of hexane followed by 2.87mmole TEAL were charged into the vial and the mixture was stirred at 60° C. for 10 minutes. 0.3 g of $B(C_6F_5)_3$ dissolved in 20 ml of hexane was charged into the vial followed by 0.1 ml of N,N-diethylaniline. The mixture was stirred at 60° C. for one hour. 0.076 g of rac-$Me_2Si(2-Me-4-phenyl-1-Ind)_2Zr(CH_3)_2$ dissolved in 10 ml of hexane was charged into the vial. The mixture was stirred at 60° C. for 30 minutes then dried under nitrogen purging. A free flowing solid was obtained at the end of the preparation.

Into a clean 2-1 autoclave, 0.1 ml of triethylaluminum in heptane (1.5 M) solution, 50 kpa of $H_2$ and 1 l of liquid propylene were charged. The reactor was heated to 70° C. 50 mg of the catalyst prepared above was then charged into the autoclave through a catalyst injection tube. The catalyst was washed into the autoclave by 200 ml of liquid propylene. The total pressure inside the reactor was around 460 psig. The polymerization was allowed to proceed at 70° C. for 1 hour. After the polymerization, the remaining propylene in the reactor was allowed to evaporate and the polymer was transferred into an evaporation dish. A total of 149 g of polymer were obtained.

Example 11B 0.3 g of $B(C_6F_5)_3$ dissolved in 20 ml of hexane was charged into a vial containing 5 g of silica gel (Davison D-952, dried at 600° C.). 0.1 ml of N,N-diethylaniline was charged into the vial. The mixture was stirred at 60° C. for one hour. 2.87mmole TEAL was then charged into the vial and the mixture was stirred at 60° C. for 10 minutes. 0.076 g of rac-$Me_2Si(2-Me-4-phenyl-1-Ind)_2Zr(CH_3)_2$ dissolved in 10 ml of hexane was charged into the vial and the mixture was stirred at 60° C. for 30 minutes then dried under nitrogen purging. A free flowing solid was obtained at the end of the preparation. A total of 350 g of polymer were obtained at the end of test.

Example 11C

Example 11B was repeated except 0.3 g of $B(C_6F_5)_3$ dissolved in 20 ml of hexane was premixed with 0.1 ml of N,N-diethylaniline, the mixture was then charged into the silica containing vial. A total of 282 g of polymer was obtained at the end of test.

TABLE

CATALYST PREPARATION CONDITIONS

| Example | $B(C_6F_5)_3$ G | $N(C_2H_5)_2Ph$ ml | TEAL I ml | TEAL II ml | Metallocene g | Yield g |
|---|---|---|---|---|---|---|
| 1 | 0.45 | 0.14 | 1.5 | 1.0 | 0.076 | 334 |
| 2 | 0.30 | 0.096 | 1.88 | 1.0 | 0.076 | 351 |
| 3 | 0.30 | 0.096 | 1.88 | — | 0.076 | 256 |
| 4 | 0.15 | 0.048 | 2.25 | 1.0 | 0.076 | 181 |
| 5 | 0.15 | 0.048 | 2.25 | — | 0.076 | 130 |
| 6 | 0.15 | 0.048 | 2.25 | — | 0.076 | 35 |
| 7 | 0.30 | 0.096 | — | 2.0 | 0.076 | 36 |
| 8 | 0.15 | 0.048 | — | — | 0.076 | 10 |
| 9 | 0.15 | 0.35 | 2.0 | — | 0.076 | 7 |
| 10 | 1.09 | 0.35 | — | 1.0 | 0.076 | 354 |
| 11A | 0.30 | 0.10 | 2.87 | — | 0.076 | 149 |
| 11B | 0.30 | 0.10 | 2.87 | — | 0.076 | 350 |
| 11C | 0.30 | 0.10 | 2.87 | — | 0.076 | 282 |

Example 12

5 g of silica gel (Davison D-952, APS=35µ, dried at 600° C) was charged into a 125 ml vial equipped with a magnetic stirring bar. Into a 50 ml vial equipped with a magnetic stirring bar, 0.3 g of $B(C_6F_5)_3$ and 20 ml of hexane were charged. The mixture was stirred on a hot plate set at 60° C. until all the $B(C_6F_5)_3$ was dissolved. 0.096 ml of N,N-diethylaniline was added into the $B(C_6F_5)_3$ containing vial and the mixture was stirred for 10 minutes. The solution was then transferred to the silica-containing vial and stirred on the hot plate for 1 hour. 1.87 ml of triethylaluminum in heptane (25 wt %) was charged into the vial and the mixture was stirred on the hot plate for 10 min. Into a 50 ml vial equipped with a magnetic stirring bar, 0.076 g of rac-Me$_2$Si(2-Me-4-phenyl-1-(CH$_3$)$_2$ and 10 ml of hexane were charged. The mixture was stirred at ambient temperature for 10 minutes then transferred to the silica-containing vial. The mixture was stirred on the hot plate for 30 minutes. The vial was dried by nitrogen purging until a free flowing solid was obtained.

Into a clean 2 l autoclave, 0.1 ml of triethylaluminum in heptane (1.5 M) solution, 50 kpa of $H_2$ and 1 l of liquid propylene were charged. The reactor was heated to 70° C. 50 mg of the catalyst prepared above was then charged into the autoclave through a catalyst injection tube. The catalyst was washed into the autoclave by 200 ml of liquid propylene. The total pressure inside the reactor was around 460 psig. The polymerization was allowed to proceed at 70° C. for 1 hour. After the polymerization, the remaining propylene in the reactor was allowed to evaporate and the polymer was transferred into an evaporation dish. The autoclave inside wall and agitator were very clean. A total of 282 g of polymer was obtained.

Example 13

Example 12 was repeated except that 0.1 ml phenyldimethylvinylsilane was mixed with rac-Me$_2$Si(2-Me-4-phenyl-1-Ind)$_2$Zr(CH$_3$)$_2$ before it was added to the silica. The catalyst was tested after its preparation as above. A total of 317 g polymer was obtained.

Example 14

5 g of silica gel (Davison D-952, APS=35µ, dried at 600° C.) was charged into a 125 ml vial equipped with a magnetic stirring bar. Into a 50 ml vial equipped with a magnetic stirring bar, 1.09 g of $B(C_6F_5)_3$ and 20 ml of hexane were charged. The mixture was stirred at ambient temperature for 5 minutes then transferred to the silica-containing vial followed by the addition of 0.35 ml of N,N-diethylaniline. The mixture was then stirred at ambient temperature for 1 hour. Into a 50 ml vial equipped with a magnetic stirring bar, 0.076 g of rac-Me$_2$Si(2-Me-4-phenyl-1-Ind)$_2$Zr(CH$_3$)$_2$ and 10 ml of toluene were charged. 1.87 ml of triethylaluminum in heptane (25 wt %) was then charged into the vial and the mixture was stirred on the hot plate set at 85 ° C. and dried by nitrogen purging until a free flowing solid was obtained.

Into a clean 2 l autoclave, 0.4 ml of triethylaluminum in heptane (1.5 M) solution, 50 kpa of $H_2$ and 1 l of liquid propylene were charged. The reactor was heated to 70° C. 50 mg of the catalyst prepared above was then charged into the autoclave through a catalyst injection tube. The catalyst was washed into the autoclave by 200 ml of liquid propylene. The total pressure inside the reactor was around 460 psig. The polymerization was allowed to proceed at 70° C. for 1 hour. After the polymerization, the remaining propylene in the reactor was allowed to evaporate and the polymer was transferred into an evaporation dish. The autoclave inside wall and agitator were very clean. A total of 171 g of polymer was obtained.

Example 15 (Comparative)

Example 14 was repeated except no triethylaluminum was added in the catalyst preparation. The catalyst turned off-while in drying. The catalyst had no activity in a polymerization test conducted as in example 14.

I claim:

1. A catalyst composition prepared by the process comprising:
   a) first combining a nucleophilic group-containing particulate support material with an arylboron or arylaluminum Lewis acid compound in the presence of a Lewis base compound;
   b) contacting the product of a) with a trialkylaluminum compound;
   c) reacting the product of b) with a transition metal precursor compound; and
   d) contacting the product of c) with a trialkylaluminum compound to form the catalyst composition.

2. The composition of claim 1 wherein said transition metal precursor compound is a Group 3–6 monocyclopentadienyl, biscyclopentadienyl, substituted monocyclopentadienyl or substituted biscyclopentadienyl compound containing at least one hydride, linear or branched alkyl, aryl or alkenyl ligand.

3. The compound of claim 2, wherein the transition metal precursor compound is a bridged substituted bisindenyl metallocene.

4. This composition of claim 2, wherein the bridged substituted bisindenyl metallocene is selected from the group consisting of Dimethylsilandiylbis (2-methyl-4-phenyl-1-indenyl)Zirconium dimethyl, Dimethylsilandiylbis(2-methyl-4,5-benzoindenyl) Zirconium dimethyl; Dimethylsilandiylbis(2-methyl-4,6-diisopropylindenyl) Zirconium dimethyl; Dimethylsilandiylbis(2-ethyl-4-phenyl-1-indenyl) Zirconium dimethyl; Dimethylsilandiylbis(2-ethyl-4-naphthyl-1-indenyl) Zirconium dimethyl, Phenyl(methyl)silandiylbis(2-methyl-4-phenyl-1-indenyl) Zirconium dimethyl, Dimethylsilandiylbis(2-methyl-4-(1-naphthyl)-1-indenyl) Zirconium dimethyl, Dimethylsilandiylbis(2-methyl-4-(2-naphthyl)-1-indenyl) Zirconium dimethyl, Dimethylsilandiylbis(2-methyl-indenyl) Zirconium dimethyl, Dimethylsilandiylbis(2-methyl-4,5-diisopropyl-1-indenyl) Zirconium dimethyl, Dimethylsilandiylbis(2,4,6-trimethyl-1-indenyl) Zirconium dimethyl, Dimethylsilandiylbis(2-methyl-α1-acenaphth-1-indenyl) Zirconium dimethyl, Phenyl(methyl)silandiylbis(2-methyl-4,5-benzo-1-indenyl)Zirconium dimethyl, Phenyl(methyl) silandiylbis(2-methyl-4,5-(methylbenzo)-1-indenyl) Zirconium dimethyl, Phenyl(methyl)silandiylbis(2-methyl-4,5-(tetramethylbenzo)-1-indenyl)Zirconium dimethyl, Phenyl(methyl)silandiylbis(2-methyl-αacenaphth-1-indenyl)Zirconium dimethyl, 1,2-Ethandiylbis(2-methyl-4,5-benzo-1-indenyl) Zirconium dimethyl, 1,2-Butandiylbis (2-methyl-4,5-benzo-1-indenyl) Zirconium dimethyl, Dimethylsilandiylbis(2-methyl-4,5-benzo-1-indenyl) Zirconium dimethyl, 1,2-Ethandiylbis(2,4,7-trimethyl-1-indenyl) Zirconium dimethyl, Dimethylsilandiylbis(2-methyl-1-indenyl) Zirconium dimethyl, 1,2-Ethandiylbis(2-methyl-1-indenyl) Zirconium dimethyl, Phenyl(methyl)silandiylbis(2-methyl-1-indenyl) Zirconium dimethyl, Diphenylsilandiylbis(2-methyl-1-indenyl) Zirconium dimethyl, 1,2-Butandiylbis(2-methyl-1-indenyl) Zirconium dimethyl, Dimethylsilandiylbis(2-ethyl-1-indenyl) Zirconium dimethyl, Dimethylsilandiylbis(2-methyl-5-isopropyl-1-indenyl) Zirconium dimethyl, Phenyl(methyl)silandiylbis (2-methyl-5-isobutyl-1-indenyl) Zirconium dimethyl, Dimethylsilandiylbis(2-methyl-5-t-butyl-1-indenyl) Zirconium dimethyl, Dimethylsilandiylbis(2,5,6-trimethyl-1-indenyl) Zirconium dimethyl, and the corresponding dichloride compounds, and mixtures thereof.

5. The composition od claim 1, wherein the nucleophilic group-containing particulate support material is hydroxyl group-containing silica or a silica-containing mix of inorganic oxides.

6. The composition of claim 1, wherein the Lewis base is selected from the group consisting of dimethylaniline, diethylaniline, diphenylmethylamine, tributylamine, diphenylmaethylamine, triphenylphosphine, trimethyl phosphite, and mixtures thereof.

7. The composition of claim 1, further comprising the step of drying the composition after step d).

8. A catalyst composition prepared by the process comprising:
   a) first combining a nucleophilic group-containing particulate support material with an arylboron or arylaluminum Lewis acid compound in the presence of a Lewis base compound;
   b) contacting the product of a) with a trialkylaluminum compound;
   c) reacting the product of b) with a bridged substituted bisindenyl metallocene; and
   d) contacting the product of c) with a trialkylaluminum compound to form the catalyst composition.

9. The composition of claim 8, wherein the bridged substituted bisindenyl metallocene is an alkyl or aryl substituted bisindenyl.

10. This composition of claim 8, wherein the bridged substituted bisindenyl metallocene is selected from the group consisting of Dimethylsilandiylbis (2-methyl-4-phenyl-1-indenyl)Zirconium dimethyl, Dimethylsilandiylbis(2-methyl-4,5-benzoindenyl) Zirconium dimethyl; Dimethylsilandiylbis(2-methyl-4,6-diisopropylindenyl) Zirconium dimethyl; Dimethylsilandiylbis(2-ethyl-4-phenyl-1-indenyl) Zirconium dimethyl; Dimethylsilandiylbis(2-ethyl-4-naphthyl-1-indenyl) Zirconium dimethyl, Phenyl(methyl)silandiylbis(2-methyl-4-phenyl-1-indenyl) Zirconium dimethyl, Dimethylsilandiylbis(2-methyl-4-(1-naphthyl)-1-indenyl) Zirconium dimethyl, Dimethylsilandiylbis(2-methyl-4-(2-naphthyl)-1-indenyl) Zirconium dimethyl, Dimethylsilandiylbis(2-methyl-indenyl) Zirconium dimethyl, Dimethylsilandiylbis(2-methyl-4,5-diisopropyl-1-indenyl) Zirconium dimethyl, Dimethylsilandiylbis(2,4,6-trimethyl-1-indenyl) Zirconium dimethyl, Dimethylsilandiylbis(2-methyl-α1-acenaphth-1-indenyl) Zirconium dimethyl, Phenyl(methyl)silandiylbis(2-methyl-4,5-benzo-1-indenyl)Zirconium dimethyl, Phenyl(methyl) silandiylbis(2-methyl-4,5-(methylbenzo)-1-indenyl) Zirconium dimethyl, Phenyl(methyl)silandiylbis(2-methyl-4,5-(tetramethylbenzo)-1-indenyl)Zirconium dimethyl, Phenyl(methyl)silandiylbis(2-methyl-αacenaphth-1-indenyl)Zirconium dimethyl, 1,2-Ethandiylbis(2-methyl-4,5-benzo-1-indenyl) Zirconium dimethyl, 1,2-Butandiylbis (2-methyl-4,5-benzo-1-indenyl) Zirconium dimethyl, Dimethylsilandiylbis(2-methyl-4,5-benzo-1-indenyl) Zirconium dimethyl, 1,2-Ethandiylbis(2,4,7-trimethyl-1-indenyl) Zirconium dimethyl, Dimethylsilandiylbis(2-methyl-1-indenyl) Zirconium dimethyl, 1,2-Ethandiylbis(2-methyl-1-indenyl) Zirconium dimethyl, Phenyl(methyl)silandiylbis(2-methyl-1-indenyl) Zirconium dimethyl, Diphenylsilandiylbis(2-methyl-1-indenyl) Zirconium dimethyl, 1,2-Butandiylbis(2-methyl-1-indenyl) Zirconium dimethyl, Dimethylsilandiylbis(2-ethyl-1-indenyl) Zirconium dimethyl, Dimethylsilandiylbis(2-methyl-5-isopropyl-1-indenyl) Zirconium dimethyl, Phenyl(methyl)silandiylbis (2-methyl-5-isobutyl-1-indenyl) Zirconium dimethyl, Dimethylsilandiylbis(2-methyl-5-t-butyl-1-indenyl) Zirconium dimethyl, Dimethylsilandiylbis(2,5,6-trimethyl-1-indenyl) Zirconium dimethyl, and the corresponding dichloride compounds, and mixtures thereof.

11. The process of claim 8, wherein nucleophilic group-containing particulate support material is hydroxyl group-containing silica or a silica-containing mix of inorganic oxides.

12. This composition of claim 8, wherein the bridged substituted bisindenyl metallocene is Dimethylsilandiylbis (2-methyl-4-phenyl-1-indenyl) Zirconium dimethyl.

13. The composition of claim 8, wherein the Lewis base is selected from the group consisting of dimethylaniline, diethylaniline, diphenylmethylamine, tributylamine, diphenylmaethylamine, triphenylphosphine, trimethyl phosphite, and mixtures thereof.

14. The composition of claim 8, further comprising the step of drying the composition after step d).

15. A process for preparing polyolefins comprising:
   a) first combining a hydroxy group-containing inorganic oxide or polymeric support material with an arylboron or arylaluminum Lewis acid compound in the presence of a Lewis base;

b) treating the product of a) with a trialkylaluminum or trialkylboron compound;

c) combining the product of b) with a bridged substituted bisindenyl metallocene;

contacting the product of c) with a trialkylaluminum compound to form the catalyst composition; and combining the product of d) with polyolefin monomers.

16. The process of claim 15, wherein hydroxyl-containing support is silica or a silica-containing mix of inorganic oxides.

17. This composition of claim 15, wherein the bridged substituted bisindenyl metallocene is selected from the group consisting of Dimethylsilandiylbis (2-methyl-4-phenyl-1-indenyl)Zirconium dimethyl, Dimethylsilandiylbis(2-methyl-4,5-benzoindenyl) Zirconium dimethyl; Dimethylsilandiylbis(2-methyl-4,6-diisopropylindenyl) Zirconium dimethyl; Dimethylsilandiylbis(2-ethyl-4-phenyl-1-indenyl) Zirconium dimethyl; Dimethylsilandiylbis(2-ethyl-4-naphthyl-1-indenyl) Zirconium dimethyl, Phenyl(methyl)silandiylbis(2-methyl-4-phenyl-1-indenyl) Zirconium dimethyl, Dimethylsilandiylbis(2-methyl-4-(1-naphthyl)-1-indenyl) Zirconium dimethyl, Dimethylsilandiylbis(2-methyl-4-(2-naphthyl)-1-indenyl) Zirconium dimethyl, Dimethylsilandiylbis(2-methyl-indenyl) Zirconium dimethyl, Dimethylsilandiylbis(2-methyl-4,5-diisopropyl-1-indenyl) Zirconium dimethyl, Dimethylsilandiylbis(2,4,6-trimethyl-1-indenyl) Zirconium dimethyl, Dimethylsilandiylbis(2-methyl-α1-acenaphth-1-indenyl) Zirconium dimethyl, Phenyl(methyl)silandiylbis(2-methyl-4,5-benzo-1-indenyl)Zirconium dimethyl, Phenyl(methyl)silandiylbis(2-methyl-4,5-(methylbenzo)-1-indenyl) Zirconium dimethyl, Phenyl(methyl)silandiylbis(2-methyl-4,5-(tetramethylbenzo)-1-indenyl)Zirconium dimethyl, Phenyl(methyl)silandiylbis(2-methyl-αacenaphth-1-indenyl)Zirconium dimethyl, 1,2-Ethandiylbis(2-methyl-4,5-benzo-1-indenyl) Zirconium dimethyl, 1,2-Butandiylbis(2-methyl-4,5-benzo-1-indenyl) Zirconium dimethyl, Dimethylsilandiylbis(2-methyl-4,5-benzo-1-indenyl) Zirconium dimethyl, 1,2-Ethandiylbis(2,4,7-trimethyl-1-indenyl) Zirconium dimethyl, Dimethylsilandiylbis(2-methyl-1-indenyl) Zirconium dimethyl, 1,2-Ethandiylbis(2-methyl-1-indenyl) Zirconium dimethyl, Phenyl(methyl)silandiylbis(2-methyl-1-indenyl) Zirconium dimethyl, Diphenylsilandiylbis(2-methyl-1-indenyl) Zirconium dimethyl, 1,2-Butandiylbis(2-methyl-1-indenyl) Zirconium dimethyl, Dimethylsilandiylbis(2-ethyl-1-indenyl) Zirconium dimethyl, Dimethylsilandiylbis(2-methyl-5-isopropyl-1-indenyl) Zirconium dimethyl, Phenyl(methyl)silandiylbis (2-methyl-5-isobutyl-1-indenyl) Zirconium dimethyl, Dimethylsilandiylbis(2-methyl-5-t-butyl-1-indenyl) Zirconium dimethyl, Dimethylsilandiylbis(2,5,6-trimethyl-1-indenyl) Zirconium dimethyl, and the corresponding dichloride compounds, and mixtures thereof.

18. The process of claim 15, wherein the monomers comprise ethylene and, optionally, one or more of propylene, 1-butene, 1-hexene, 1octene, isobutylene, 1,4-hexadiene, 1,8-decadiene, 1, 10-dodecadiene, norbornene, ethylidene norbornene, vinyl norbornene or styrene.

19. This composition of claim 15, wherein the bridged substituted bisindenyl metallocene is Dimethylsilandiylbis (2-methyl-4-phenyl-1-indenyl) Zirconium dimethyl.

20. The process of claim 15, wherein the trialylkboron compound is trisperfluorophenylboron.

21. The composition of claim 15, wherein the Lewis base is selected from the group consisting of dimethylaniline, diethylaniline, diphenylmethylamine, tributylamine, diphenylmaethylamine, triphenylphosphine, trimethyl phosphite, and mixtures thereof.

22. The process of claim 15, further comprising the step of drying the composition after step d).

* * * * *